(12) United States Patent
Addison et al.

(10) Patent No.: US 10,217,992 B2
(45) Date of Patent: Feb. 26, 2019

(54) RECHARGEABLE BATTERIES EMPLOYING CATALYZED MOLTEN NITRATE POSITIVE ELECTRODES

(71) Applicant: Liox Power, Inc., Pasadena, CA (US)

(72) Inventors: Dan D. Addison, Pasadena, CA (US); Vyacheslav Bryantsev, Pasadena, CA (US); Gregory V. Chase, Pasadena, CA (US); Vincent Giordani, Pasadena, CA (US); Jasim Uddin, Pasadena, CA (US); Wesley Walker, Pasadena, CA (US)

(73) Assignee: Liox Power, Inc., Pasadena, CA (US)

( * ) Notice: Subject to any disclaimer, the term of this patent is extended or adjusted under 35 U.S.C. 154(b) by 138 days.

(21) Appl. No.: 14/914,248

(22) PCT Filed: Aug. 8, 2014

(86) PCT No.: PCT/US2014/050450
§ 371 (c)(1),
(2) Date: Feb. 24, 2016

(87) PCT Pub. No.: WO2015/021451
PCT Pub. Date: Feb. 12, 2015

(65) Prior Publication Data
US 2016/0204418 A1    Jul. 14, 2016

Related U.S. Application Data

(60) Provisional application No. 61/863,747, filed on Aug. 8, 2013.

(51) Int. Cl.
*H01M 4/02* (2006.01)
*H01M 4/38* (2006.01)
(Continued)

(52) U.S. Cl.
CPC .......... *H01M 4/136* (2013.01); *H01M 4/134* (2013.01); *H01M 4/382* (2013.01);
(Continued)

(58) Field of Classification Search
CPC .... H01M 4/661; H01M 4/9033; H01M 4/136; H01M 4/134; H01M 4/5825;
(Continued)

(56) References Cited

U.S. PATENT DOCUMENTS 2,981,590 A    4/1961  Parker
3,940,284 A *  2/1976  Ruben ................... H01M 4/32
                                                429/206
(Continued)

FOREIGN PATENT DOCUMENTS

WO    WO 2013/019489 A1    2/2013

OTHER PUBLICATIONS

International Search Report, International Application No. PCT/US2014/050450, completed Feb. 1, 2015, dated Mar. 13, 2015.

*Primary Examiner* — Sean P Cullen
(74) *Attorney, Agent, or Firm* — Adriano & Associates (57) ABSTRACT

High energy rechargeable batteries employing catalyzed molten nitrate positive electrodes and alkali metal negative electrodes are disclosed. Novel and advantageous aspects of the present invention are enabled by the provision catalytically active materials that support the reversible formation of $NO_3^-$ from $O^{2-}$ and $NO_2^-$ during battery charging. Such catalytically active materials allow highly efficient cycling and selectively eliminate irreversible side reactions that occur when cycling without such catalysts.

22 Claims, 10 Drawing Sheets

(51) Int. Cl.
*H01M 4/58* (2010.01)
*H01M 4/66* (2006.01)
*H01M 4/80* (2006.01)
*H01M 4/90* (2006.01)
*H01M 10/39* (2006.01)
*H01M 4/134* (2010.01)
*H01M 4/136* (2010.01)
*H01M 10/0525* (2010.01)
*H01M 10/0562* (2010.01)

(52) U.S. Cl.
CPC ......... *H01M 4/5825* (2013.01); *H01M 4/661* (2013.01); *H01M 4/80* (2013.01); *H01M 4/9025* (2013.01); *H01M 4/9033* (2013.01); *H01M 10/0525* (2013.01); *H01M 10/0562* (2013.01); *H01M 10/399* (2013.01); *H01M 2004/021* (2013.01); *H01M 2004/027* (2013.01); *H01M 2004/028* (2013.01); *H01M 2300/0074* (2013.01); *Y02E 60/50* (2013.01)

(58) Field of Classification Search
CPC ...... H01M 4/382; H01M 4/80; H01M 4/9025; H01M 10/399; H01M 10/0525; H01M 10/0562

USPC .................................... 429/112, 207, 223, 305
See application file for complete search history.

(56) References Cited

U.S. PATENT DOCUMENTS

| | | | |
|---|---|---|---|
| 5,187,029 A | 2/1993 | Coetzer et al. | |
| H1449 H * | 6/1995 | Miles | 429/112 |
| 8,475,959 B2 | 7/2013 | Venkatachalam et al. | |
| 8,795,868 B1 * | 8/2014 | Miles | H01M 4/405 |
| | | | 429/110 |
| 2006/0102491 A1 | 5/2006 | Kelly et al. | |
| 2006/0127766 A1 | 6/2006 | Yamate | |
| 2006/0127773 A1 | 6/2006 | Kawakami et al. | |
| 2006/0141346 A1 * | 6/2006 | Gordon | H01M 6/36 |
| | | | 429/112 |
| 2009/0047573 A1 * | 2/2009 | Miles | H01M 4/40 |
| | | | 429/112 |
| 2009/0154060 A1 * | 6/2009 | Anderson | H01G 9/04 |
| | | | 361/502 |
| 2010/0092851 A1 * | 4/2010 | Miles | H01M 4/40 |
| | | | 429/112 |
| 2012/0305651 A1 * | 12/2012 | Anderson | B82Y 30/00 |
| | | | 235/492 |

* cited by examiner

RECHARGEABLE BATTERIES EMPLOYING CATALYZED MOLTEN NITRATE POSITIVE ELECTRODES

CROSS-REFERENCES TO RELATED APPLICATIONS

The present application claims the benefit of the earlier filing date of U.S. Patent Application No. 61/863,747, filed on Aug. 8, 2013, the content of which is hereby incorporated by reference herein in its entirety.

FIELD OF THE INVENTION

The present invention relates generally to rechargeable batteries. More particularly, the invention relates to high capacity rechargeable molten salt batteries, along with electrolytes, electrode active materials and catalysts employed therein.

BACKGROUND OF THE INVENTION

Batteries are electrochemical cells designed to store and release energy. For simplicity, the term "battery" is used herein to refer to energy storage devices comprising one or more electrochemical cells configured to provide an output voltage and/or electric current. Primary batteries convert chemical energy to electric work in a single discharge, while secondary or rechargeable batteries may be discharged and charged multiple times. Due to the ubiquitous need for energy storage and the limitations arising therefrom, improved batteries enable advancements in numerous fields of technology and human interest.

Exemplary state-of-the-art rechargeable battery technologies include lead-acid, Ni-MH and Li-ion batteries. The theoretical potential for performance improvements in these mature technologies is limited. In particular, practically achieved capacities are nearing theoretical limitations defined by the positive and negative electrode active materials. Consequently, novel electrode materials and cell chemistries are sought that provide significantly higher theoretical specific energy and energy density.

The aforementioned rechargeable battery technologies utilize either aqueous or organic electrolytes and generally operate at or near ambient temperature. For certain applications, active thermal management is required for these systems to maintain battery temperature near 25° C., since deviations from this temperature regime lead to performance losses, cell failure and/or safety hazards. In contrast, molten salt batteries operate at an elevated temperature above the melting point of an inorganic molten salt electrolyte. Primary molten salt batteries, often referred to as "thermal batteries", are stored in the solid state and are heated to activate for a single discharge. Storage in an inactive solid state prevents self-discharge, thus allowing very long shelf life. An exemplary commercial primary thermal battery utilizes a Li alloy anode, a molten alkali metal halide electrolyte and a cathode comprising $FeS_2$ active material. While commercially successful as a primary thermal battery, rechargeable Li alloy-$FeS_2$ cells exhibit inferior performance attributes compared to, for example, Li-ion batteries, due largely to issues related to the high (>300° C.) operating temperature imposed by the high liquidus temperatures of alkali metal halide eutectics The "ZEBRA" battery, which comprises a molten Na metal negative electrode and a transition metal halide (e.g. NiCl) positive electrode, provides an example of a commercially successful rechargeable molten salt battery. In this system, negative and positive electrode compartments are separated by a solid $Na^+$ conducting beta alumina solid electrolyte ("BASE") membrane. The positive electrode compartment further comprises a molten salt electrolyte composed of $NaAlCl_4$, which has a melting point of 167° C. ZEBRA batteries typically operate at >245° C., a temperature which is imposed by transport and interfacial properties of the BASE membrane. State-of-the-art commercial ZEBRA-type batteries achieve >3000 cycles and practical specific energy and energy density of ~115 Wh/kg and ~160 Wh/l, respectively. However, ZEBRA batteries are still encumbered by issues related to the high operating temperature, including long startup times, poor stability to thermal cycling and safety concerns, which limit their practicality for certain applications, particularly electric vehicles.

Molten salt batteries that are capable of lower temperature operation (e.g. <200° C.) are an attractive target of research and development, since it is contemplated that this lower temperature may still confer improved electrochemical properties, such as fast electrode kinetics and charge transport, while lessening problems and materials constraints associated with the higher temperature regime (e.g. polymeric seals may be used instead of ceramic to metal seals). Alkali metal nitrates and nitrites are a class of inorganic molten salt that have been investigated for use as "intermediate temperature" molten salt electrolytes, since they can be formulated in eutectic mixtures with melting points below 100° C. Alkali metal nitrates and nitrites provide additional beneficial characteristics motivating their consideration for both primary and rechargeable molten salt batteries. Some of these properties include high thermal stability (>500° C.), stability in contact with air, low viscosity, low cost, low corrosiveness to typical container materials, little to no volatility and high heat capacity.

Moreover, alkali metal nitrates exhibit unique electrochemical properties which previously have been proposed in various connections related to energy storage applications. For example, the $NO_3^-$ anion is reduced by Li metal according to the following reaction:

$$2Li+LiNO_3 \rightarrow LiNO_2+Li_2O \qquad 1)$$

This reaction generates a passivating film, or solid-electrolyte interphase (SEI), on the surface of Li metal composed of $Li_2O$ which is permeable to $Li^+$ cations but inhibits continuous reaction with the electrolyte. This SEI phenomenon has enabled research and development of batteries employing molten nitrate electrolytes in direct contact with Li metal or Li alloys. A variety of positive electrode materials have been disclosed for use in such batteries including, for example, soluble transition metal cations, transition metal oxides and, more recently, gaseous $O_2$ (see U.S. Pat. Nos. 4,416,958, H1,544, and 6,544,691, each of which are incorporated by reference herein in their entireties).

The oxidizing $NO_3^-$ anion has also been disclosed for use as the positive electrode active material in molten salt batteries (see U.S. Pat. Nos. 4,260,667 and 4,535,037, each of which is incorporated by reference herein in their entireties). According to this concept, the battery discharge process involves oxidation of a metal negative electrode and reduction of the $NO_3^-$ anion component of the molten salt electrolyte on the positive electrode surface. In the case of Li metal batteries, the positive electrode reaction is:

$$2Li^++LiNO_3+2e^- \rightarrow LiNO_2+Li_2O \qquad 2)$$

At 150° C., the thermodynamic potential of this reaction is ~2.5 V vs Li$^+$/Li and the theoretical specific capacity is 646 mA/cm$^2$, equating to a high specific energy of 1615 Wh/kg.

Due to substantial irreversibility, this positive electrode has heretofore been considered for use in primary thermal batteries and has not been demonstrated in a rechargeable battery. The object of the present invention is to provide catalytic materials that enable highly efficient cycling and long cycle life of cells employing $NO_3^-$ as a positive electrode active material by catalyze reversible formation of $NO_3^-$ from $NO_2^-$ and $O^{2-}$ during battery charging. This objective is motivated by the need for rechargeable batteries with improved performance (e.g. specific energy and energy density) compared to state-of-the-art rechargeable batteries (e.g. Li-ion).

DETAILED DESCRIPTION OF THE INVENTION

Embodiments of the invention are described in detail with reference to figures. Specific embodiments are provided for illustration and are non-limiting. Less detail is provided for established art involved in practicing the invention to avoid obscuring novel and non-obvious features.

High energy rechargeable batteries employing catalyzed molten nitrate positive electrodes and alkali metal negative electrodes are disclosed. Novel and advantageous aspects of the present invention are enabled by the provision catalytically active materials that support the reversible formation of $NO_3^-$ from $O^{2-}$ and $NO_2^-$ during battery charging. Such catalytically active materials allow highly efficient cycling and selectively eliminate irreversible side reactions that occur when cycling without such catalyst. Beneficial aspects of the present invention may include but are not limited to higher specific energy, higher energy density, lower voltage hysteresis, higher coulombic efficiency, higher round-trip energy efficiency and longer cycle life than state-of-the art rechargeable batteries.

Figure 1A:
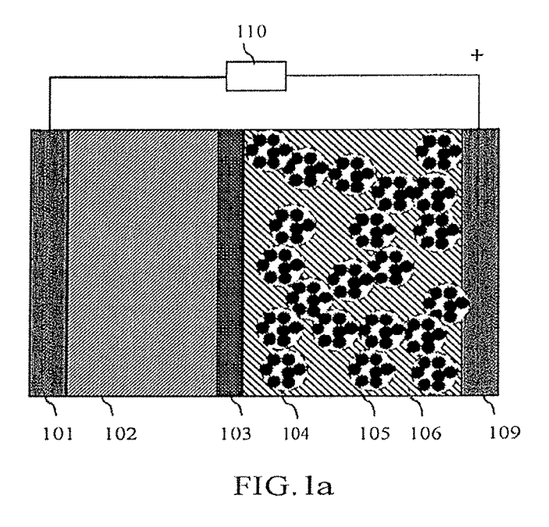
FIGS. 1a and 1b depict schematic drawings illustrating the discharge (1a) and charge (1b) processes of rechargeable battery employing a catalyzed molten nitrate positive electrode in accordance with the present invention.
Figure 1B:
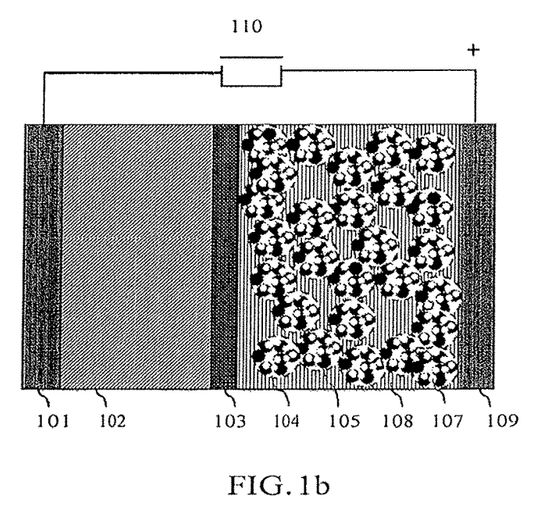

Referring now to FIGS. 1a and 1b, the inventive battery is depicted in both the charged (1a) and discharged (1b) states in accordance with a preferred embodiment of the invention. The battery includes a negative electrode comprising Li metal 102, an electrolyte capable of conducting Li$^+$ cations 103, and a porous positive electrode 104, which comprises a catalytically active material 105 that supports the reversible formation of $NO_3^-$ from $NO_2^-$ and $O^{2-}$ during battery charging. During both discharge and charge, the porous positive electrode is at least partially filled with a molten salt. In the fully charged state, the molten salt comprises Li$^+$ cations and $NO_3^-$ anions 106, whereas in the fully discharged state, the $NO_3^-$ anions have been electrochemically reduced to form an $Li_2O$ 107, which precipitates as a solid on the surface of the porous positive electrode and catalytically active material, along with $NO_2^-$ which forms a molten salt with Li$^+$ cations 108. The Li negative electrode and the catalyzed molten nitrate positive electrode are connected via two charge transport pathways, the first of which is the electrolyte for conducting Li$^+$ cations and the second of which connects current collectors for the negative and positive electrode (101 and 109, respectively) via an external circuit 110. In order to initiate cell operation, the internal temperature is brought and maintained above the liquidus temperature of the molten salt. Methods of temperature control for the present invention are not particularly limited and may include, for example, resistive heating elements. During the discharging process, the Li negative electrode is electrochemically oxidized. A cell voltage determined by the potential difference between the Li negative electrode and catalyzed molten nitrate positive electrode drives Li$^+$ cations and electrons through electrolyte and the external circuit, respectively. $NO_3^-$ anions in the positive electrode is electrochemically reduced to form $NO_2^-$ and $O^{2-}$. Due to the provision of a catalytically active material, reverse positive electrode processes occur during cell charging at low overpotential and with negligible or no side reactions. The Li negative electrode is reconstituted via electrochemical reduction of alkali metal cations.

Referring back to FIGS. 1a and 1b, the molten salt comprising $NO_3^-$ electrode active material in the fully charged state and $NO_2^-$ as a discharge product in the fully discharged state is formulated with alkali metal cations in a mixture preferably having a liquidus temperature greater than or equal to 80° C. and less than or equal to 250° C. Such mixtures may comprise binary, ternary or quarternary mixtures of alkali metal nitrates including $LiNO_3$, $NaNO_3$, $KNO_3$ and $CsNO_3$ or their corresponding nitrites Exemplary molten salts of the present invention may consist of mixtures of $LiNO_3$ and $KNO_3$ (charged state) or $LiNO_2$ and $KNO_2$ (discharged state) and having melting points less than or equal to 130° C. (see Janz G J, Allen C B, Bansal N P, Murphy R M and Tompkins R P T. 1978. Physical Properties Data Compilations Relevant to Energy Storage 1: Molten Salts: Eutectic Data, U.S. Department of Commerce, Technical Report No. NSRDS-NBS-61, which is incorporated by reference herein in its entirety).

Referring back to FIGS. 1a and 1b, the catalytically active material enables efficient recombination of $NO_2^-$ and $O^{2-}$ during battery charging. In the absence of such catalytic materials, the following two irreversible electrochemical oxidation processes have been observed to occur which lead to gas evolution and cell failure during charging (see Comparative Examples 1 and 2 and FIGS. 2 and 3):

$$LiNO_2 \rightarrow Li^+ + NO_2 + e^- \quad (3)$$

$$Li_2O \rightarrow 2Li^+ + \tfrac{1}{2}O_2 + 2e^- \quad (4)$$

These electrochemical processes lead to irreversible consumption of the electrolyte. In the presence of catalytically active material, the reverse of reaction (2) above proceeds. Without being bound by a particular theory, it is contemplated that certain materials may serve as redox catalyst through catalytic cycles of the general form:

$$LiNO_2 + MO \rightarrow LiNO_3 + M \quad (5)$$

$$M + Li_2O + 2e^- \rightarrow LiNO_3 + MO + 2Li^+ \quad (6)$$

Where the sum of reactions (5) and (6) equal reaction (3). In this example mechanism, M can represent any metal or metal oxide. This is example is only intended for illustration and other catalytic mechanisms may be operative in cells of the present invention. Catalytically active materials of the present invention may include oxides or oxyanions of transition metals including Ti, V, Cr, Mn, Fe, Co, Ni, Cu, Zn, Mo and Ru or elements including B, Al, C, Si, Ge and Sn. Certain preferred embodiments may employ non-stoichiometric transition metal oxides as catalytically active materials. In a particularly preferred embodiment, non-stoichiometric oxides of Ni, incorporating NiO and $Ni_2O_3$ are employed. In a further refinement, oxides of Ni may be doped with a metal dopant such as Li in an amount ranging from 0 to 20 wt %. In further preferred embodiments, the catalytically active material is fabricated in a high surface area structure having a BET surface area greater than or equal to 5 $m^2/g$, 10 $m^2/g$, 50 $m^2/g$ or 100 $m^2/g$. In the case of Ni oxide catalysts, a high surface area catalytic surface can be formed in situ on the surface of a porous metal substrate such as Ni nanoparticles (see Examples 1 and 2 and FIG. 4-7 below) by contacting the porous metal substrate with the molten nitrate salt. An in situ catalyst formation process may be exemplified by the reaction between a nitrate molten salt and the oxide film that coats Ni which has been pre-exposed to air:

$$2NiO + LiNO_3 \rightarrow Ni_2O_3 + LiNO_2 \quad (7)$$

Figure 8:
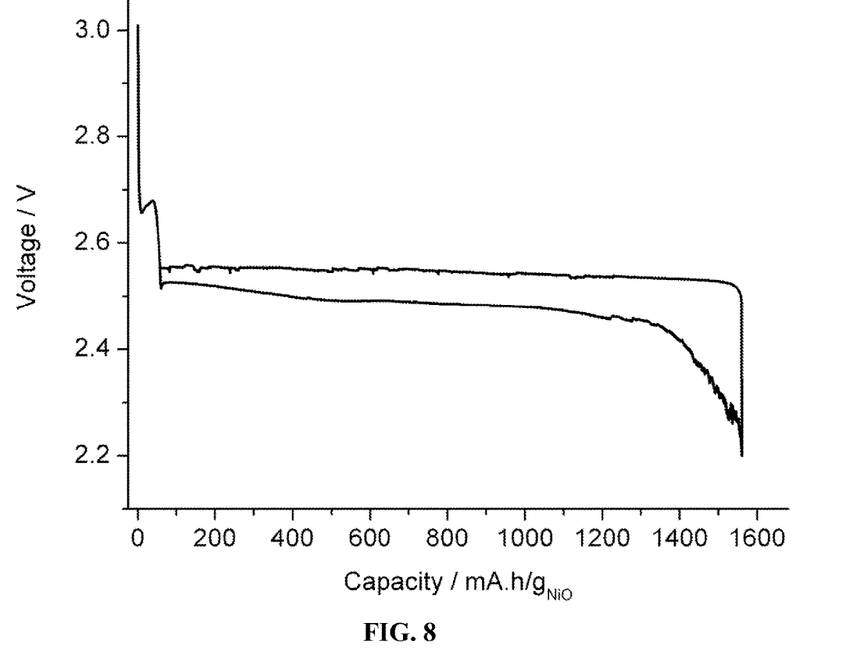
FIG. 8 depicts a voltage vs. capacity plot of a hermetically-sealed Li-molten nitrate cell having a high surface area fabricated catalytic Li-doped NiO positive electrode cycled once.

In other embodiments, a high surface area Li doped NiO may be pre-fabricated and incorporated into the positive electrode (see Examples 3 and 4 and FIG. 8 below).

Referring back to FIG. 1, the negative electrode comprising Li may be Li metal or an alloy thereof, such as Li—Al or Li—Si. The electrolyte may be composed of the molten salt in direct contact with the negative electrode which forms and SEI on its surface. In certain embodiments, an interlayer comprising a solid ceramic membrane is positioned to prevent contact between the negative electrode and the molten salt. The solid ceramic membrane may be selected from the group consisting of LISICON, NASICON, garnet-type ceramics and beta alumina.

Comparative Example 1

Figure 2:
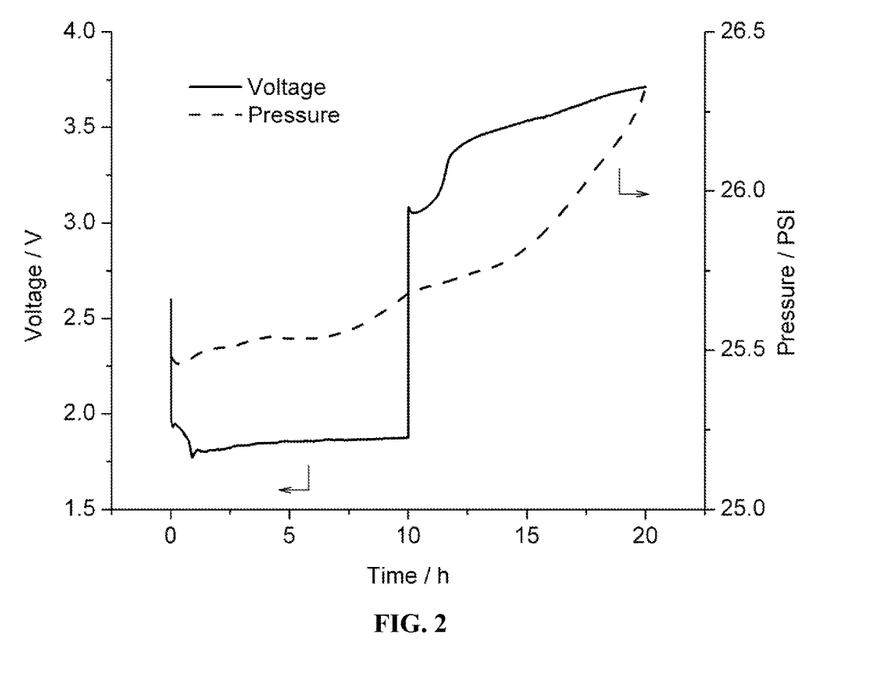
FIG. 2 depicts a voltage vs. time plot and in situ pressure monitoring of a hermetically-sealed Li-molten nitrate cell cycled with an uncatalyzed carbon positive electrode.

Cycling on uncatalyzed carbon: The positive electrode was made of carbon Super P and $LiNO_3$—$KNO_3$ eutectic (70-30 wt. %), ~50 mg total mass, was dry pressed onto 1 cm diameter SS 316 mesh. The cell used a Li anode of 0.8 cm diameter 230 microns thick and an electrolyte pellet consisting of a 1.2 cm diameter WHATMAN glass fiber disk separator impregnated w 130 μL of electrolyte (300 mg). The cell was cycled under Argon at 150° C. using current density of 0.25 $mA/cm^2$ and a 10 h limited discharge time within a hermetically-sealed fixture. with attached pressure sensor. The rise of pressure during the charging half cycle demonstrates unwanted irreversible side reaction (likely reactions (3) and (4) above) (FIG. 2).

Comparative Example 2

Cycling on Uncatalyzed Stainless Steel

Figure 3:
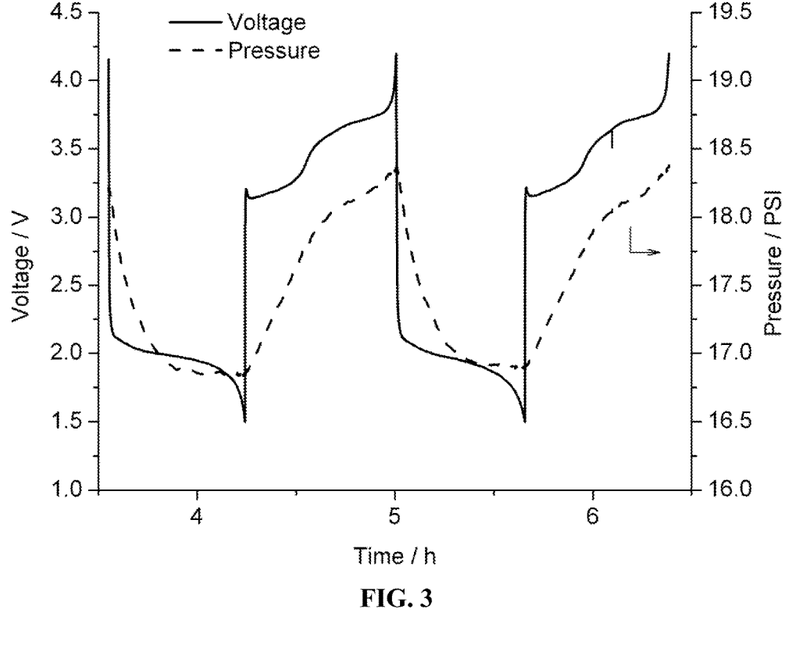
FIG. 3 depicts a voltage vs. time plot and in situ pressure monitoring of a hermetically-sealed Li-molten nitrate cell cycled with an uncatalyzed stainless steel positive electrode.

The positive electrode was made by stacking 5 1 cm diameter SS 316 meshes weighed 20 mg each. The cell used a Li anode 0.8 cm diameter 250 microns thick and an electrolyte pellet consisting of a 1.2 cm diameter WHATMAN glass fiber disk separator impregnated w 130 μL of electrolyte (300 mg). The cell was cycled under Argon at 150° C. using current density of 5 $mA/cm^2$ with 1.5 and 4.2 V voltage cutoffs in discharge and charge, respectively, within a hermetically-sealed fixture with attached pressure sensor. Again, the rise of pressure during each charging half cycle demonstrates unwanted irreversible side reaction (FIG. 3).

Example 1

Figure 4:
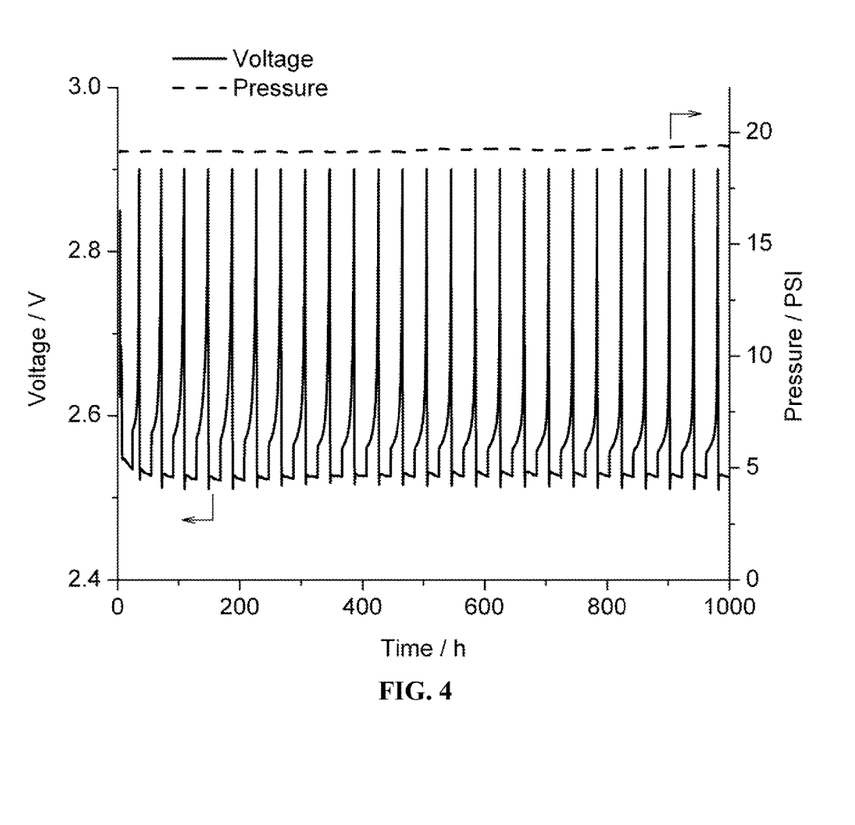
FIG. 4 depicts a voltage vs. time plot and in situ pressure monitoring of a hermetically-sealed Li-molten nitrate cell cycled with a Ni nanoparticle positive electrode with in situ-formed catalytic NiO.
Figure 5:
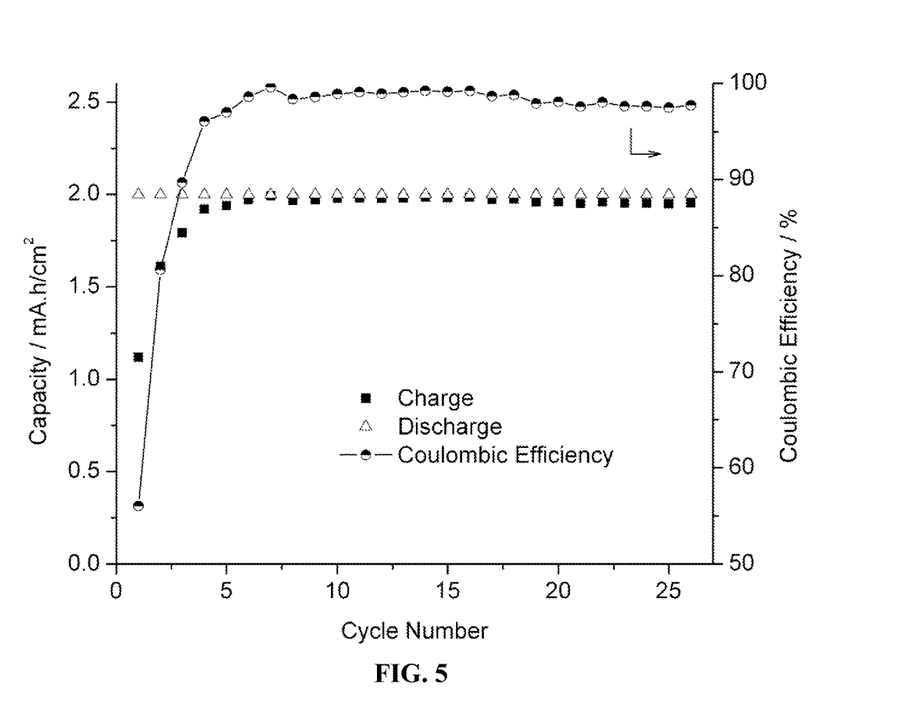
FIG. 5 depicts a plot of discharge capacity, charge capacity and coulombic efficiency vs. cycle number of a hermetically-sealed Li-molten nitrate cell cycled with a Ni nanoparticle positive electrode with in situ-formed catalytic NiO.

Cycling with Capacity-Limited Discharges on Ni Nanoparticles with In Situ Formed Catalytic NiO The positive electrode is 30 mg Ni nanoparticles (50 nm MTI 10 $m^2/g$ BET specific surface area) pressed on 1.2 cm diameter Al mesh, no binder & no eutectic employed in cathode formulation. The anode is 0.8 cm diameter Li disk and electrolyte is 1.2 cm WHATMAN glass fiber disk separator soaked with 130 μL of $LiNO_3$—$KNO_3$ eutectic (300 mg). The cell cycled under Ar at 0.1 $mA/cm^2$ current density with 20 h limited time discharge and a 2.9 V charging cutoff within a hermetically-sealed fixture with attached pressure sensor. No change in pressure is observed during cycling and the cell converges on 100% coulombic efficiency over 25 cycles (FIGS. 4 and 5).

Example 2

Figure 6:
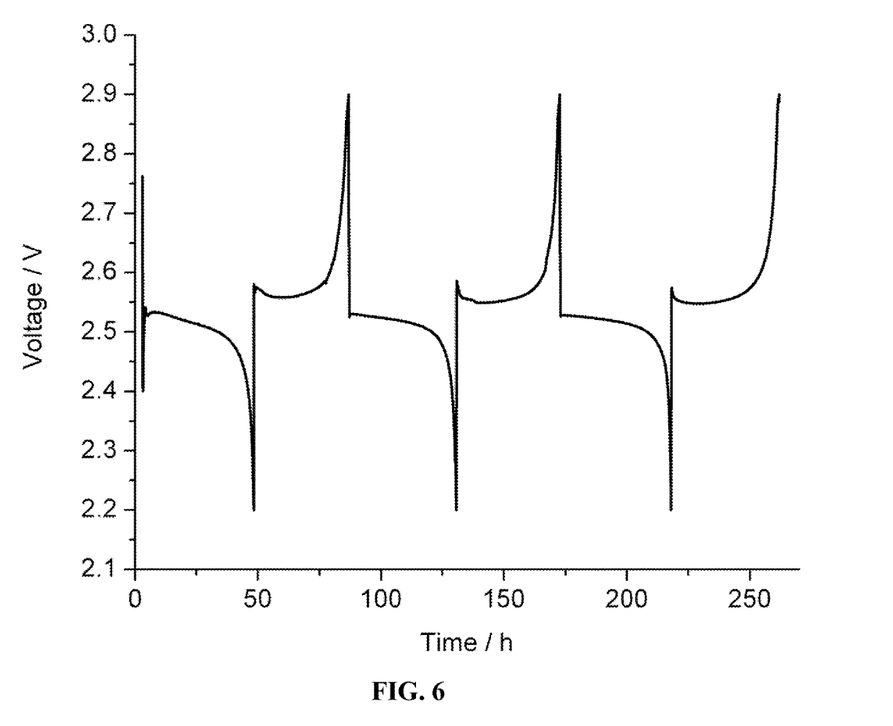
FIG. 6 depicts a voltage vs. time plot (voltage-limited discharges) of a hermetically-sealed Li-molten nitrate cell cycled with a Ni nanoparticle positive electrode with in situ-formed catalytic NiO.
Figure 7:
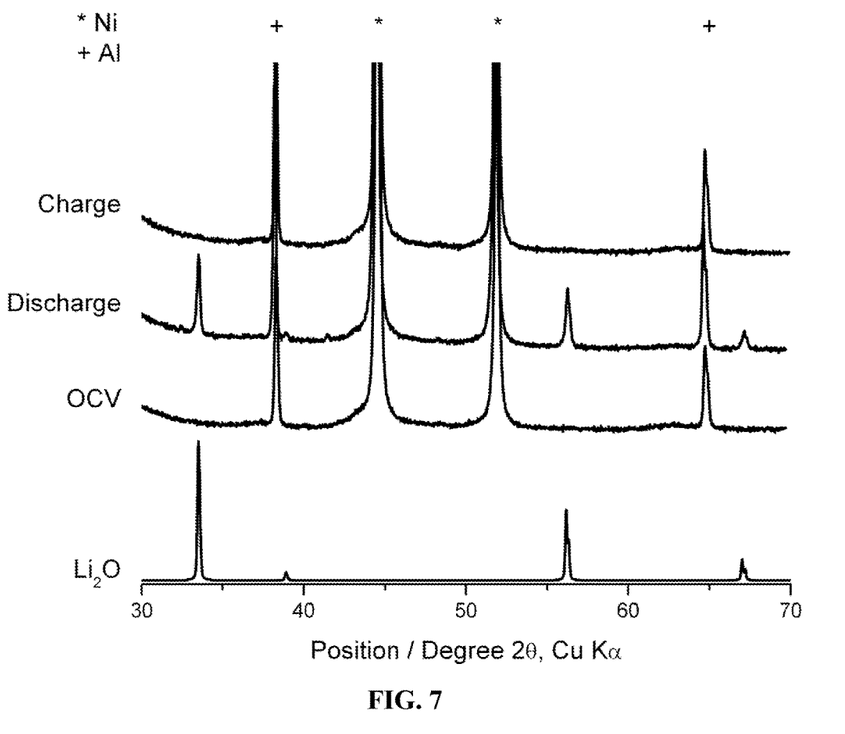
FIG. 7 depicts x-ray diffraction patterns of discharged and charged Ni nanoparticle positive electrode with in situ-formed catalytic NiO.

Cycling with Voltage-Limited Discharges on Ni Nanoparticles with In Situ Formed Catalytic NiO The positive electrode is 30 mg Ni nanoparticles (50 nm MTI 10 $m^2/g$ BET surface area) pressed on 1.2 cm diameter Al mesh, no binder & no eutectic employed in cathode formulation. The anode is 0.8 cm diameter Li disk and electrolyte is 1.2 cm WHATMAN glass fiber disk separator soaked with 130 μL of $LiNO_3$-$KNO_3$ eutectic (300 mg). The cell cycled under Ar at 0.25 mA/cm2 current density between 2.2 and 2.9 V cathodic and anodic cutoffs, respectively, in a hermetically sealed cell fixture (FIG. 6). X-ray diffraction patterns of the positive electrode indicate formation of $Li_2O$ during discharge and decomposition of $Li_2O$ during charge (FIG. 7)

Example 3

Fabrication of High Surface Area Li-Doped NiO Catalytic Positive Electrode 5 mol % of lithium hydroxide was mixed with nickel hydroxide nanopowder in $H_2O$:iso-propanol (2:1). The mixture was sonicated for an hour, and then stirred vigorously for 2 hours. The solvents were removed by heating the mixture at 55° C. in an oven for overnight. The resulted green powder was then heated at 300° C. in a furnace for 3 h to give the Li-doped NiO in quantitative yield. The synthesized Li-doped NiO was characterized by XRD. The BET surface area was determined to be 119 $m^2/g$.

Example 4

Deep Cycling on High Surface Area Li-Doped NiO Catalytic Positive Electrode Positive electrode was 15 mg Li-doped NiO as synthesized in Example 3 pressed on 1.2 cm diameter Al mesh. The cathode comprises 85% NiO, 10% carbon black (conductive additive) and 5% PTFE binder. No eutectic was added to electrode. The anode is 0.8 cm diameter Li disk and electrolyte is 1.2 cm WHATMAN glass fiber disk separator soaked with 130 µL of $LiNO_3$—$KNO_3$ eutectic (300 mg). The cell cycled under Ar at 0.25 mA/cm2 current density between 2.2 and 2.9 V cathodic and anodic cutoffs, respectively. A very high discharge capacity of >1600 mAh/g of the Li doped NiO is observed with very low polarization (<50 mV) during both discharge and charge (FIG. 8)

Example 5

Conversion of $NO^{2-}$ to $NO^{3-}$ in the Presence of Gaseous $O_2$ and $NO^-$.

Figure 9:
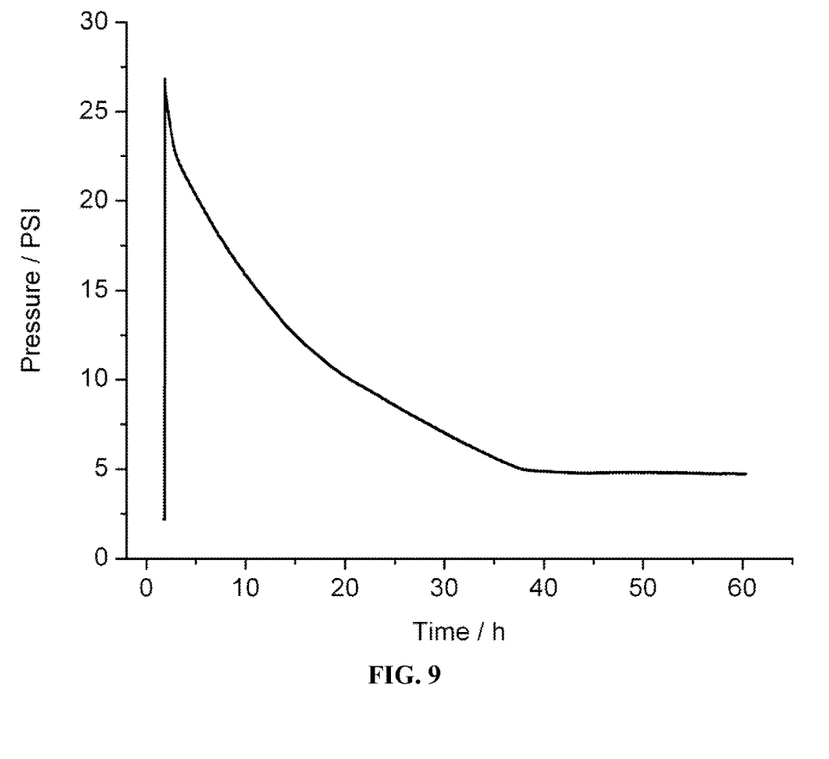
FIG. 9 depicts a pressure vs. time plot of a hermetically-sealed reaction vessel containing a solution of $LiNO_2$, $O_2$ gas and a catalytic quantity of NO.
Figure 10:
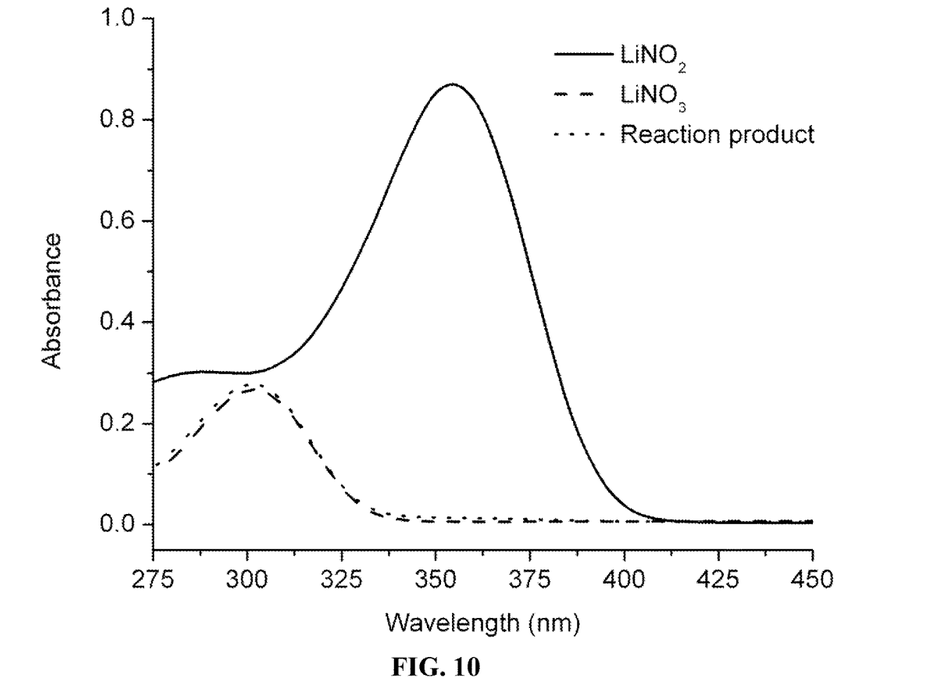
FIG. 10 depicts UV-Visible absorbance spectra of a solution of $LiNO_2$ before and after exposure to $O_2$ gas and a catalytic quantity of NO.

The reaction between $LiNO_2$ and $O_2$ in the $LiNO_3$—$KNO_3$ melt at 150° C. in presence of catalytic amount of NO was carried out in a hermetically-sealed vessel with a pressure sensor. 500 mg $LiNO_3$—$KNO_3$ melt and $LiNO_2$ (1.89 mmol) were taken in the reaction vessel, and hermetically sealed it. The mixture was melted at 150° C. $LiNO_2$ was completely dissolved in the melt at 150° C. A catalytic amount of NO gas (13789.5 Pa) followed by excess amount of $O_2$ (171127.88 Pa) were added to the reaction vessel at 150° C. The reaction progress was monitored by absolute pressure drop using the pressure sensor (FIG. 9). The experimental pressure drop (152029.4 Pa) was close to the expected pressure drop (148237.3 Pa) indicating the compete conversion of the reaction. The reaction product $LiNO_3$ was identified and quantified by the UV-visible spectroscopy (FIG. 10). The UV-visible data confirmed the complete conversion of $LiNO_2$ to $LiNO_{23}$ at 150° C. in presence of catalytic amount of NO gas.

The invention claimed is:

1. A rechargeable battery employing a catalyzed molten nitrate porous positive electrode comprising:
    a) a negative electrode comprising an alkali metal;
    b) an electrolyte capable of conducting alkali metal cations; and
    c) a catalyzed molten porous positive electrode;
    wherein said molten nitrate porous positive electrode is at least partially filled with a molten salt comprising the alkali metal cations and $NO_3$, and
    wherein said catalyzed molten nitrate porous positive electrode further comprises a catalytically active material that supports a reversible formation of $NO_3^-$ from $NO_2^-$ and $O^{2-}$ during battery charging,
    wherein said catalytically active material has a BET surface area greater than or equal to 5 $m^2/g$.

2. The battery of claim 1, wherein said battery operates at a temperature greater than or equal to 80° C. and less than or equal to 250° C.

3. The battery of claim 1, wherein said battery can be discharged to a capacity greater than or equal to 1000 mAh/g of positive electrode and catalytically active material mass.

4. The battery of claim 1, wherein said battery can be cycled at a current density greater than or equal to 0.2 $mA/cm^2$ with overpotential of less than or equal to 50 mV on discharge and charge and greater than or equal to 80% coulombic efficiency.

5. The battery of claim 1, wherein said molten salt comprises $NO_2^-$.

6. The battery of claim 1, wherein said alkali metal cations in the molten salt are selected from the group consisting of $Li^+$, $Na^+$, $K^+$, $Cs^+$ and combinations thereof.

7. The battery of claim 1, wherein said catalytically active material is a redox catalyst.

8. The battery of claim 1, wherein said catalytically active material comprises an oxide or oxyanion of a transition metal selected from the group consisting of Ti, V, Cr, Mn, Fe, Co, Ni, Cu, Zn, Mo, and Ru.

9. The battery of claim 1, wherein said catalytically active material comprises an oxide or oxyanion of an element selected from the group consisting of B, Al, C, Si, Ge and Sn.

10. The battery of claim 1, wherein said catalytically active material is a non-stoichiometric transition metal oxide.

11. The battery of claim 1, wherein said catalytically active material is selected from the group consisting of NiO, $Ni_2O_3$ and combinations thereof.

12. The battery of claim 1, wherein said catalytically active material comprises a metal dopant in an amount ranging from 0 to 20 wt %.

13. The battery of claim 12, wherein said metal dopant is Li.

14. The battery of claim 1, wherein said catalytically active material is formed in situ by heating a porous metal substrate in contact with said molten salt comprising alkali metal cations and $NO_3^-$.

15. The battery of claim 14, wherein said porous metal substrate is Ni.

16. The battery of claim 1, wherein an interlayer comprising a solid ceramic membrane is positioned to prevent contact between said negative electrode and said molten salt.

17. The battery of claim 16, wherein said solid ceramic membrane is selected from the group consisting of LISICON, NASICON, garnet-type ceramics and beta alumina.

18. The battery of claim 1, wherein said battery is hermetically-sealed.

19. The battery of claim 18, wherein said battery can be discharged at constant temperature to a capacity greater than or equal to 1 mAh and charged with greater than or equal to 80% coulombic efficiency while maintaining internal cell pressure with less than or equal to 1378.95 Pa variation.

20. The battery of claim 1, wherein the BET surface area is greater than or equal to 10 $m^2/g$.

21. The battery of claim 20, wherein said BET surface area is greater than or equal to 50 $m^2/g$.

22. The battery of claim 21, wherein said BET surface area is greater than or equal to 100 m$^2$/g.

* * * * *